United States Patent
Noguchi et al.

(10) Patent No.: US 11,110,622 B2
(45) Date of Patent: Sep. 7, 2021

(54) DEVICE FOR MANUFCATURING CHOPPED FIBER BUNDLE AND METHOD FOR MANUFACTURING SAME

(71) Applicant: Toray Industries, Inc., Tokyo (JP)

(72) Inventors: Yasumoto Noguchi, Shiga (JP); Tamotsu Suzuki, Shiga (JP)

(73) Assignee: Toray Industries, Inc., Tokyo (JP)

( * ) Notice: Subject to any disclaimer, the term of this patent is extended or adjusted under 35 U.S.C. 154(b) by 328 days.

(21) Appl. No.: 15/740,114

(22) PCT Filed: Jun. 10, 2016

(86) PCT No.: PCT/JP2016/067328
§ 371 (c)(1),
(2) Date: Dec. 27, 2017

(87) PCT Pub. No.: WO2017/002582
PCT Pub. Date: Jan. 5, 2017

(65) Prior Publication Data
US 2018/0186020 A1      Jul. 5, 2018

(30) Foreign Application Priority Data
Jul. 1, 2015 (JP) .............................. JP2015-132667

(51) Int. Cl.
*B26D 1/15*      (2006.01)
*D06H 7/10*      (2006.01)
(Continued)

(52) U.S. Cl.
CPC ............... *B26D 1/15* (2013.01); *B26D 1/153* (2013.01); *B26D 1/225* (2013.01); *B26D 5/00* (2013.01); *B26D 7/08* (2013.01); *D01G 1/04* (2013.01); *D01G 1/10* (2013.01); *D06H 7/10* (2013.01); *B26D 2001/0033* (2013.01)

(58) Field of Classification Search
CPC .......... B26D 1/15; B26D 1/153; B26D 1/225; B26D 5/00; B26D 7/08; B26D 2001/003;
(Continued)

(56) References Cited

U.S. PATENT DOCUMENTS 2,221,869 A * 11/1940 Halin ...................... D01G 1/10
                                                        19/0.62
2,719,336 A * 10/1955 Stotler ..................... D01G 1/10
                                                        19/0.51
(Continued)

FOREIGN PATENT DOCUMENTS

JP          7-41333 A       2/1995
JP       2003-165739 A      6/2003
(Continued)

*Primary Examiner* — Kenneth E Peterson
*Assistant Examiner* — Liang Dong
(74) *Attorney, Agent, or Firm* — DLA Piper LLP (US)

(57) ABSTRACT

A device for manufacturing a chopped fiber bundle includes a cutter roll provided with one or more disk blades on a circumference of a roll core having a center axis coinciding with a rotation axis of the roll core and a nip roll provided in parallel with the rotation axis of the roll core, to feed a reinforcing fiber yarn to be continuously cut between the nip roll and the cutter roll, further including a rotary drive mechanism that rotates the cutter roll and at least one of: a reciprocating drive mechanism that reciprocates the cutter roll along the rotation axis of the roll core; and a traverse guide that traverses the reinforcing fiber yarn along the rotation axis of the roll core.

7 Claims, 10 Drawing Sheets

(51) Int. Cl.
*D01G 1/04* (2006.01)
*B26D 1/22* (2006.01)
*B26D 7/08* (2006.01)
*B26D 5/00* (2006.01)
*B26D 1/153* (2006.01)
*D01G 1/10* (2006.01)
*B26D 1/00* (2006.01)

(58) Field of Classification Search
CPC ... B26D 7/06; D01G 1/04; D01G 1/10; D06H 7/10; Y10T 83/656; Y10T 83/658
USPC .......... 83/423, 338, 913, 504, 506, 498, 37
See application file for complete search history.

(56) References Cited

U.S. PATENT DOCUMENTS

| | | | | |
|---|---|---|---|---|
| 2,777,519 | A * | 1/1957 | Speakman | D01G 1/04 83/402 |
| 3,497,920 | A * | 3/1970 | Brownell | D02J 1/18 19/65 T |
| 3,768,356 | A * | 10/1973 | Gamble | D01G 1/04 83/411.6 |
| 3,791,247 | A * | 2/1974 | Pretz | B26D 1/151 83/418 |
| 4,347,071 | A * | 8/1982 | Willis | C03B 37/16 65/536 |
| 4,885,964 | A * | 12/1989 | Nielsen | B26D 1/245 83/56 |
| 5,954,278 | A | 9/1999 | Bennett et al. | |
| 5,970,837 | A * | 10/1999 | Arterburn | C03B 37/16 29/40 |
| 2003/0192413 | A1* | 10/2003 | Aoki | B26D 7/2635 83/13 |

FOREIGN PATENT DOCUMENTS

| | | |
|---|---|---|
| JP | 2006-200107 A | 8/2006 |
| JP | 2008-296408 A | 12/2008 |
| JP | 2009-114611 A | 5/2009 |
| JP | 2009-114612 | 5/2009 |

* cited by examiner

DEVICE FOR MANUFCATURING CHOPPED FIBER BUNDLE AND METHOD FOR MANUFACTURING SAME

TECHNICAL FIELD

This disclosure relates to a device for manufacturing a chopped fiber bundle and a method of manufacturing the same, wherein the chopped fiber bundle has a good impregnation, fluidity and shape followability as a shape forming material while it exhibits excellent mechanical properties as a fiber reinforced plastic.

BACKGROUND

Fiber reinforced plastics made from reinforcing fiber and matrix resin have been noticed and increasingly demanded year by year in industrial fields for its high specific strength, high specific elastic modulus, excellent mechanical properties and high-function such as weatherability and chemical resistance. To form a complicated shape such as a three-dimensional shape, desired forming products can be manufactured from a forming material comprising matrix resin and fiber bundle aggregation (which may be called "fiber bundle") of discontinuous reinforcing fiber such as carbon fiber through heating and pressing by a known forming technique using SMC (Sheet Molding Compound), Stampable Sheet or the like.

A forming product of SMC can be manufactured by steps of cutting the fiber bundle as orthogonally crossing the reinforcing fiber into pieces of 25 mm fiber length, impregnating the chopped fiber bundle with thermosetting matrix resin to prepare a semi-cured sheet-shaped base material of SMC, and heat pressing it by a heating-type press machine. A forming product of Stampable Sheet can be manufactured by steps of heating a sheet-shaped base material (Stampable Sheet) of nonwoven fabric mat made of 25 mm pieces of chopped fiber bundles or continuous reinforcing fiber which have been impregnated with thermoplastic resin above the melting point of the thermoplastic resin by using an infrared heater, and laminating it to be cold pressed in a die at a predetermined temperature. The SMC or Stampable Sheet is often cut into a shape smaller than the final forming product and placed on a forming die, and then is extended (flowed) under pressure to form a shape of the forming product. Such reinforcing fiber bundles of discontinuous fiber can flow freely with resin and therefore can follow a complicated shape such as a three-dimensional shape.

To improve the above-described fiber reinforced plastic material made of discontinuous reinforcing fiber, JP 2003-165739 A, JP 2009-114611 A and JP 2009-114612 A disclose discontinuous fiber having a cutting angle less than 90° with respect to fiber direction. According to those disclosures, breaking strength can be improved by using chopped strand having an inclined cross section to increase the area joining resin and strand end part to prevent stress concentration. They also disclose breaking strength improvement effects of chopped strand which is easily opened to monofilaments so that the area joining resin and strand end part increases to prevent stress concentration.

However, JP '739 does not disclose practically how to cut reinforcing fibers obliquely.

JP '611 discloses a cutting roll having a cutting blade obliquely arranged on a rotation roll. However, such a configuration cannot be applied to a practical production because complicated shape increases production cost while inseparable blade increases blade exchange cost in comparison with ordinary cutter roll of which blade can be replaced separately from a main body. Such a disadvantage is troublesome especially for fibers having a high strength such as carbon fiber and aramid fiber because blades are worn out quickly because of the high strength of the fiber itself.

JP '612 discloses a method in which fibers are introduced obliquely to a cutter roll having linear blades in a circumferential direction of roll like an ordinary cutter roll. This type of blade can be replaced separately and therefore the above-described problem can be avoided. However, to cut fibers continuously as maintaining the oblique introduction of fiber yarn, the yarn has to be hardened or fixed onto a plate to prevent the yarn drawn by a roll from changing its shape or fiber direction. Although JP '612 discloses fibers hardened by resin impregnation, such a measure might increase costs. In addition, the introduction angle should be extremely large to obtain a small cutting angle defined by the formula of "Cutting angle=(90−introduction angle of fiber)" for this type of example where the cutting direction of cutter blade is orthogonal to the fiber drawing direction because the smaller the cutting angle is the more the advantage of inclined cutting is. For example, to achieve cutting angle of 5°, yarn route has to be introduced to a cutter roll as inclined by 85°. That means the fiber direction should be almost parallel to the cutter rotation axis, but it is difficult to continuously introduce fibers with a constant introduction angle and a stable shape of fiber under such an inclination angle.

Focusing attention on the above-described problems, it could be helpful to provide a device for manufacturing a chopped fiber bundle and a method of manufacturing the same to achieve continuous inclined cutting of reinforcing fiber yarn with a simple configuration, especially for the inclined cutting by a smaller angle.

SUMMARY

We thus provide:

(1) A device for manufacturing a chopped fiber bundle comprising a cutter roll provided with one or more disk blades on a circumference of a roll core having a center axis coinciding with a rotation axis of the roll core and a nip roll provided in parallel with the rotation axis of the roll core, to feed a reinforcing fiber yarn to be continuously cut between the nip roll and the cutter roll, further comprising a rotary drive mechanism for rotating the cutter roll and at least one of: a reciprocating drive mechanism for reciprocating the cutter roll along the rotation axis of the roll core; and a traverse guide for traversing the reinforcing fiber yarn along the rotation axis of the roll core.

(2) The device for manufacturing a chopped fiber bundle according to (1), wherein the reciprocating drive mechanism and the traverse guide are controlled independently.

(3) The device for manufacturing a chopped fiber bundle according to (2), wherein a running velocity of the reciprocating and/or the traverse guide is controlled arbitrarily.

(4) The device for manufacturing a chopped fiber bundle according to any one of (1) to (3), wherein a downmost stream roll of the traverse guide is provided close to and in parallel with the nip roll.

(5) The device for manufacturing a chopped fiber bundle according to any one of (1) to (4), wherein a cleaning roll is provided close to and in parallel with an axial direction of at least one of the cutter roll and the nip roll.

(6) The device for manufacturing a chopped fiber bundle according to any one of (1) to (5), wherein the cutter roll comprises a disk blade and a spacer alternating on a circumference of the roll core.

(7) The device for manufacturing a chopped fiber bundle according to any one of (1) to (6), wherein the reinforcing fiber yarn comprises a carbon fiber.

(8) A method of manufacturing a chopped fiber bundle having a cutter roll provided with one or more disk blades on a circumference of a roll core having a center axis coinciding with a rotation axis of the roll core and a nip roll provided in parallel with the rotation axis of the roll core, comprising steps of: feeding a reinforcing fiber yarn to be continuously cut between the nip roll and the cutter roll while rotating the cutter roll; and reciprocating the cutter roll along the rotation axis of the roll core and/or traversing the reinforcing fiber yarn along the rotation axis of the roll core with a traverse guide to continuously cut the reinforcing fiber yarn.

We provide a device for manufacturing a chopped fiber bundle and a method of manufacturing the same to achieve continuous inclined cutting of reinforcing fiber yarn with a simple configuration, especially for the inclined cutting by a smaller angle.

EXPLANATION OF SYMBOLS

10: reinforcing fiber yarn
11: reinforcing fiber yarn
12: bobbin
20: traverse guide
21: first traverse roll
22: second traverse roll
30: nip roll
40: cutter roll
41: roll core
42: disk blade
43: spacer
44: blade crowded part
45: additional blade
46: cleaning roll
60: chopped fiber bundle
61: chopped fiber bundle (with angle smaller than 60)
62: chopped fiber bundle (in line symmetry with 60 having the same angle)
63: chopped fiber bundle
64: chopped fiber bundle θ: cutting angle [°] of fiber
V: relative velocity [m/min] of mobile velocity of cutter roll 40 in center axial direction to mobile velocity of traverse guide 20 guiding reinforcing fiber yarn 10
Rω: circumferential speed [m/min] of cutter roll 40
P: arrangement pitch of rotary blade

DETAILED DESCRIPTION

Hereinafter, examples of our devices and methods will be explained with reference to the figures.

Whole Device

Figure 1:
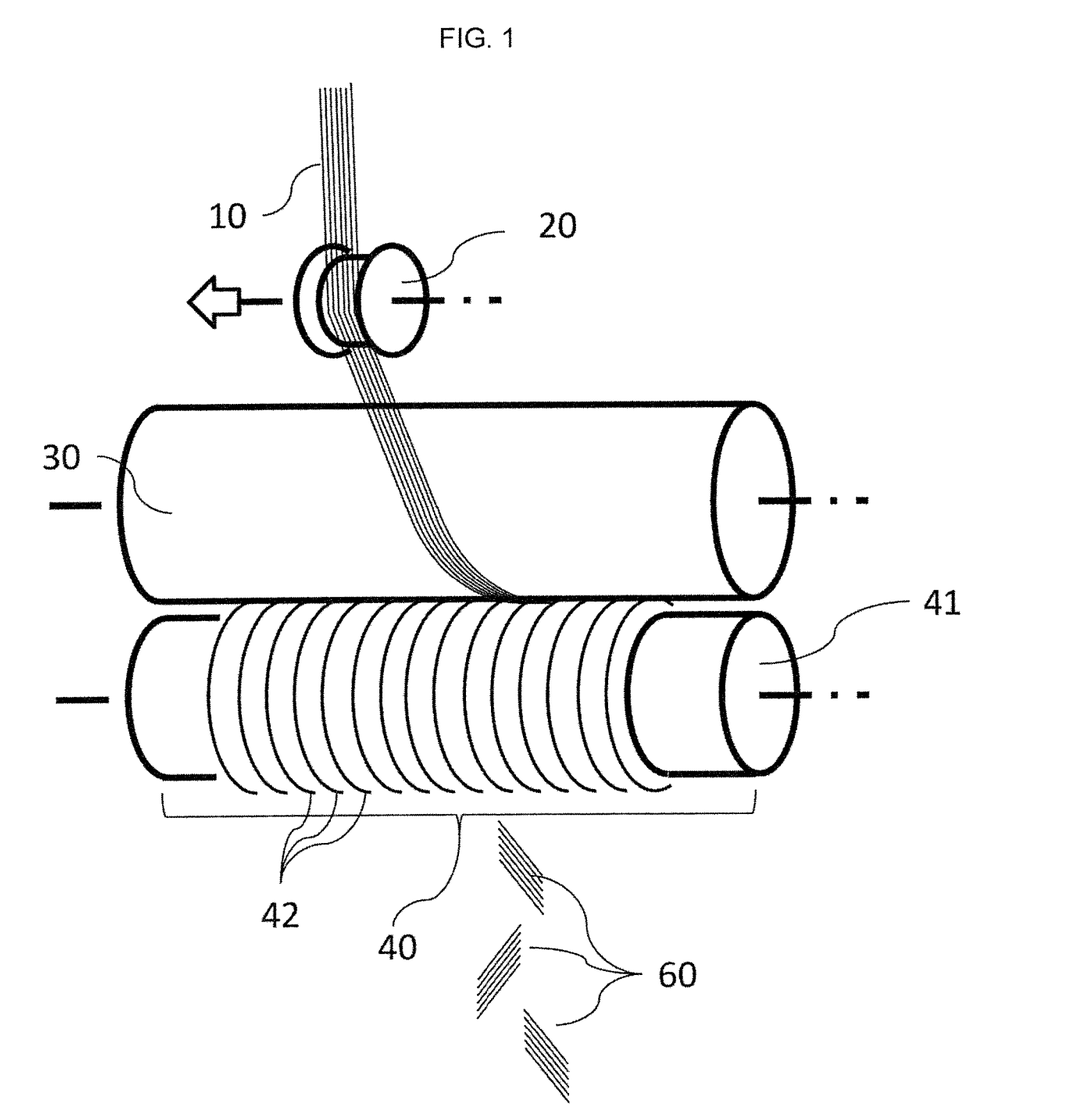
FIG. 1 is a perspective view showing an example of our manufacturing method of chopped fiber bundle.

FIG. 1 shows a manufacturing device for our manufacturing method of chopped fiber bundle. Our manufacturing device comprises cutter roll 40 provided with one or more disk blades 42 on the circumference of roll core 41 having rotation axis coinciding with center axis and nip roll 30 provided in parallel with the rotation axis of roll core 41. It also comprises a rotary drive mechanism (not shown) that rotates cutter roll 40 to feed reinforcing fiber yarn 10 to be continuously cut between nip roll 30 and cutter roll 40. It further comprises at least one of (a) or (b): (a) reciprocating drive mechanism (not shown) for reciprocating cutter roll 40 along the rotation axis of the cutter roll; or (b) traverse guide 20 that traverses the reinforcing fiber yarn along the rotation axis of the roll.

Traverse Guide

Traverse guide 20 runs in approximately-parallel with the rotation axis of nip roll 30 or cutter roll 40 so that reinforcing fiber yarn 10 approaches obliquely to circumferential direction of nip roll 30.

Reciprocating Drive Mechanism

Alternatively, it is possible that cutter roll 40 and nip roll 30 are driven to the left and right in approximately-parallel with the rotation axis of traverse guide 20 by a reciprocating drive mechanism. Traverse guide 20 may be either fixed or provided as capable of running in approximately-parallel with the rotation axis of nip roll 30 or cutter roll 40 as described above. With both configurations, reinforcing fiber yarn 10 can approach obliquely to circumferential direction of nip roll 30.

Nip Roll, Cutter Roll

Cutter roll 40, which indicates a whole roll-shaped rotary body consisting of roll core 41 and disk blades 42, has a shape with edge of disk blade 42 protruding from the roll surface. It is preferable that disk blade 42 is removable from a viewpoint of maintenance of blades, although it may be fixed to or integrated with the circumference of roll core 41. Nip roll 30 having a relatively flat surface is provided in approximately-parallel with the rotation axis of cutter roll 40 as being adjacent or contacting cutter roll 40. It is preferable that nip roll 30 or roll core 41 is made of an elastic material such as rubber and urethane to increase gripping force, although it is not limited to them. Nip roll 30 made of elastic material improves contact to cutter roll 40 so that reinforcing fiber yarn 10 can make sure to be cut.

Control Method

It is preferable that the reciprocating drive mechanism or traverse guide 20 has a control mechanism capable of performing independent traverse on each. Such an independently controlled reciprocating drive mechanism or traverse guide 20 can be driven by displaced period, speed, width or the like of each traverse without synchronizing so that chopped fiber bundles are uniformly dispersed. When a plurality of reinforcing fiber yarns 10 are cut by a single device, it is preferable that each reinforcing fiber yarn 10 traverses independently by each traverse guide 20. It is preferable that it traverses independently even from the reciprocating drive mechanism.

It is preferable that the reciprocating drive mechanism or traverse guide 20 is configured to have a mechanism to arbitrarily change the relative velocity with respect to the axial direction in a series of traverse movement, for reasons to be described later.

Reinforcing Fiber Bundle

It is preferable that reinforcing fiber bundle 10 consists of reinforcing fibers having a high strength and requiring frequent replacement of disk blade 42 which tends to waste. It is preferable that it consists of carbon fibers having a high hardness, although it is not limited in particular.

Whole Aspect of Cutting Process

Reinforcing fiber yarn 10 is led between a pair of cutter roll 40 and nip roll 30 by traverse guide 20 running to left and right, and is cut into a shape of a chopped fiber bundle 60 by disk blade 42 protruding from the surface of cutter roll 40. Nip roll 30 always contacts cutter roll 40 so that cutter roll 40 drives nip roll 30 by friction. It is possible that nip roll 30 is driven while cutter roll 40 is made free to move. When it is not driven by friction because of slip or the like, both nip roll 30 and cutter roll 40 may be driven.

Reinforcing fiber yarn 10 is led between a pair of cutter roll 40 and nip roll 30 by a guide (not shown) or the like. Reinforcing fiber yarn 10 is cut into a shape of chopped fiber bundle 60 by disk blade 42 that protrudes from the surface of cutter roll 40 by driving cutter roll 40 to left and right with a reciprocating drive mechanism to run in approximately-parallel with the rotation axis of cutter roll 40.

Tension Given to Reinforcing Fiber Yarn

Reinforcing fiber yarn 10 intervenes between cutter roll 40 and nip roll 30 and is drawn inside with rotation of cutter roll 40 and/or nip roll 30 to give tension. Thereby reinforcing fiber yarn 10 is fixed as keeping a predetermined angle between traverse guide 20 and nip roll 30. Thus reinforcing fiber yarn 10 can be cut directly without specific treatment such as fixing with a guide and preliminary hardening by impregnating reinforcing fiber yarn 10 with resin.

Explanation of the Angle Adjustment

Figure 2:
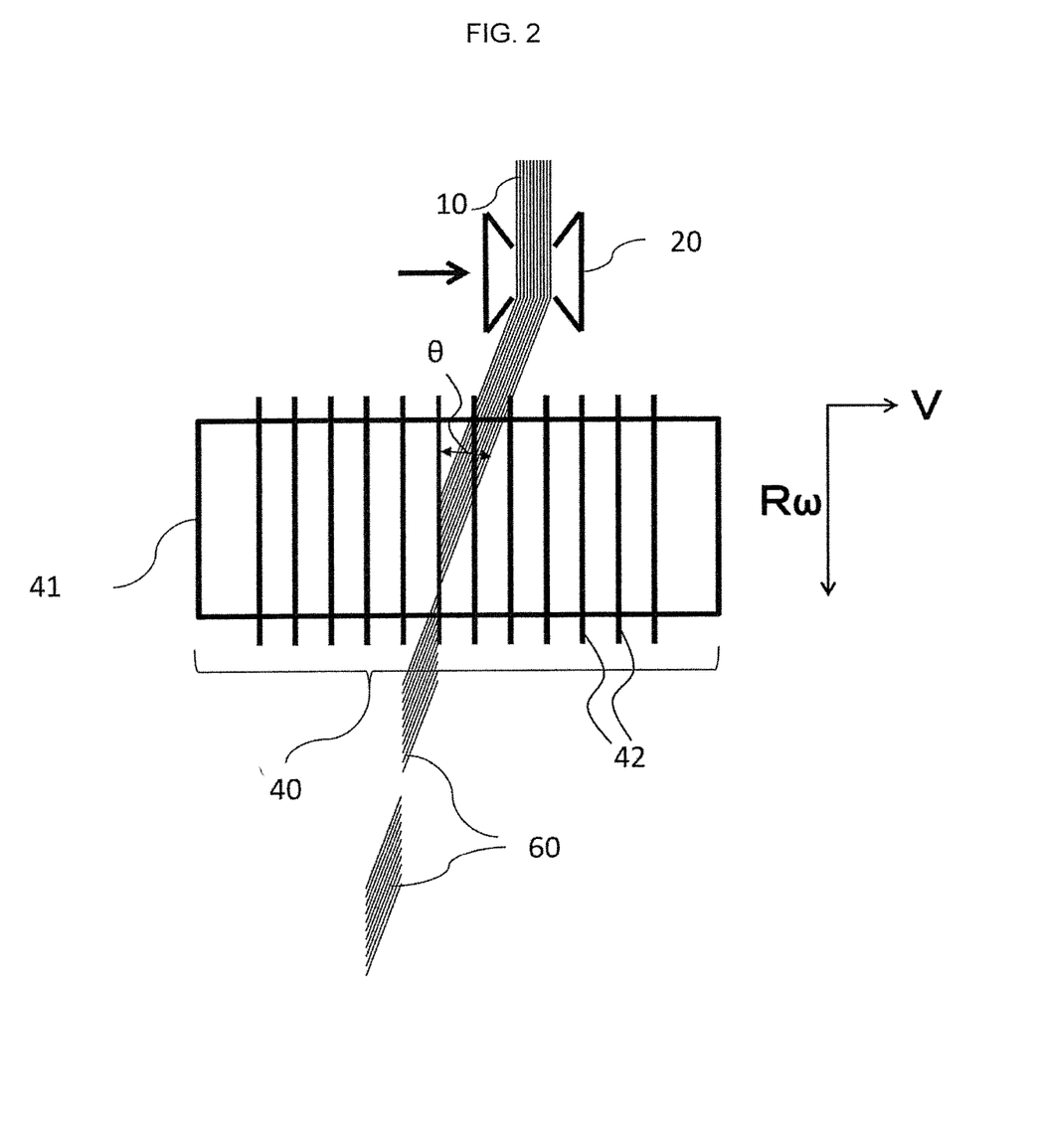
FIG. 2 is a schematic view showing an angle between disk blade attached to cutter roll and reinforcing fiber yarn cut by disk blade.

FIG. 2 explains about the angle to cut reinforcing fiber yarn 10 into chopped fiber bundle 60. At a relative velocity of mobile velocity of cutter roll 40 in the center axial direction to mobile velocity of traverse guide 20 guiding reinforcing fiber yarn 10, reinforcing fiber yarn 10 approaches disk blade 42 on cutter roll 40 by angle θ [°] and is cut. As a result, chopped fiber bundle 60 shaped in a parallelogram having angle θ [°] is formed. Besides, angle θ [°] is defined as an acute angle between disk blade 42 and reinforcing fiber yarn 10.

V [m/min] is defined as a relative velocity of mobile velocity of cutter roll 40 in center axial direction to mobile velocity of traverse guide 20 guiding reinforcing fiber yarn 10 while Rω [m/min] is defined as a circumferential speed of cutter roll 40. Angle θ [°] is decided according to the relation between them. Therefore angle θ [°] can be controlled easily in stepless manner at any time without changing disk blades 42 by adjusting these speeds appropriately.

Also, angle θ [°] can be changed continuously by changing relative velocity V [m/min] arbitrarily. Such a control of cutting process makes it possible to provide mixture of strands having various angles θ [°]. Specifically, relative velocity V [m/min] can be changed easily by providing a mechanism for arbitrarily adjusting the mobile velocity of traverse guide 20.

A chopped fiber bundle having an extremely small angle θ [°], which may be θ<5°, can be made by setting circumferential speed Rω [m/min] greater than relative velocity V [m/min] or by adjusting relative velocity V [m/min] itself to a small value. Such a chopped fiber bundle having an extremely small cutting angle θ [°] can be applied as discontinuous fiber reinforced plastics having a strength improved.

Explanation of Cutting Length

Figure 3:
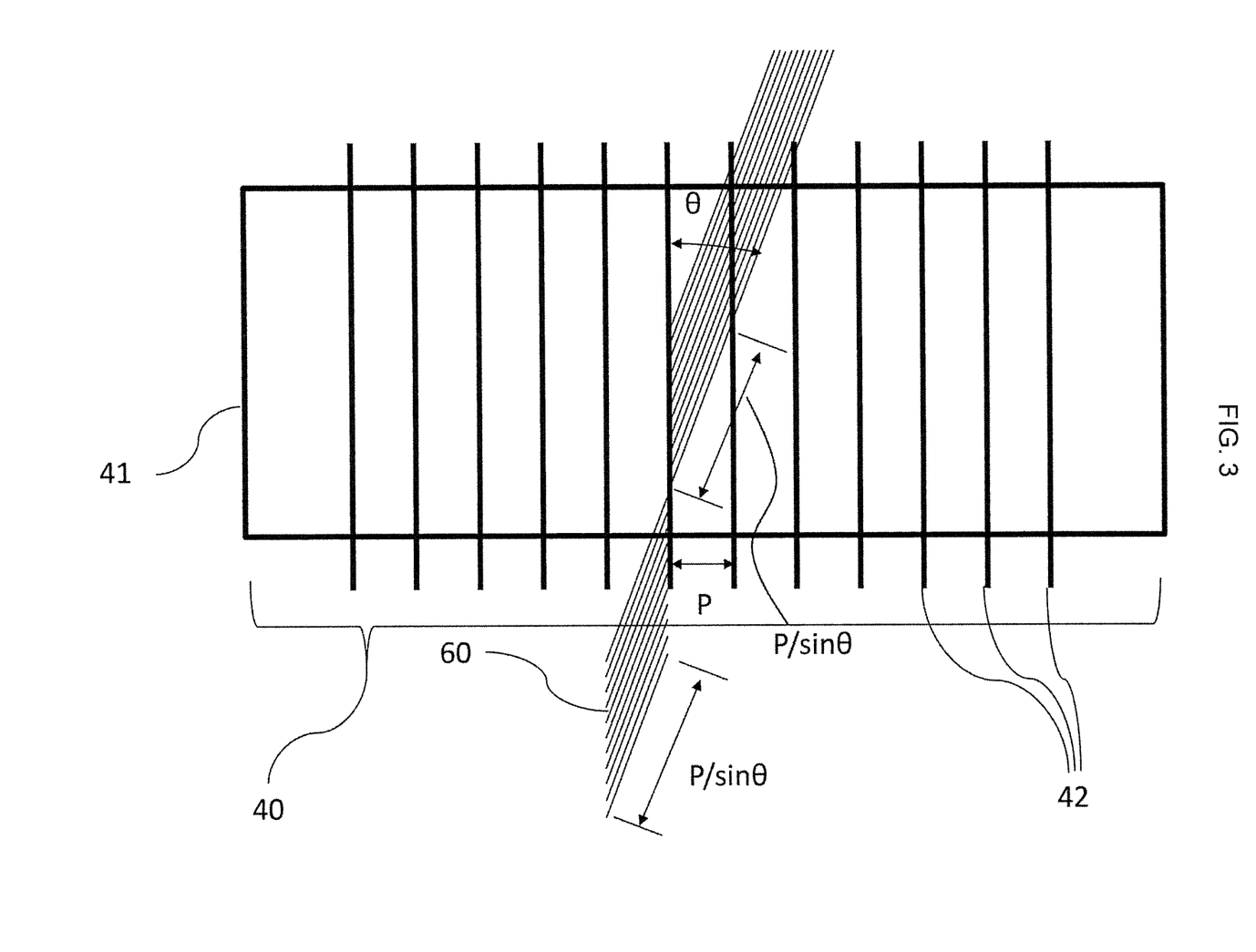
FIG. 3 is a partial enlarged view showing cutting length of chopped fiber bundle shown in FIG. 2.

As shown in FIG. 3 in which reinforcing fiber yarn 10 approaches by angle θ [°] to disk blades 42 arranged at intervals of P [mm], reinforcing fiber yarn 10 comes to have cutting length of P/sin θ [mm]. Thus, simply by changing angle θ [°], the cutting length can be controlled arbitrarily in stepless manner without changing pitch P [mm] of disk blades 42.

Control at Turning

Figure 4:
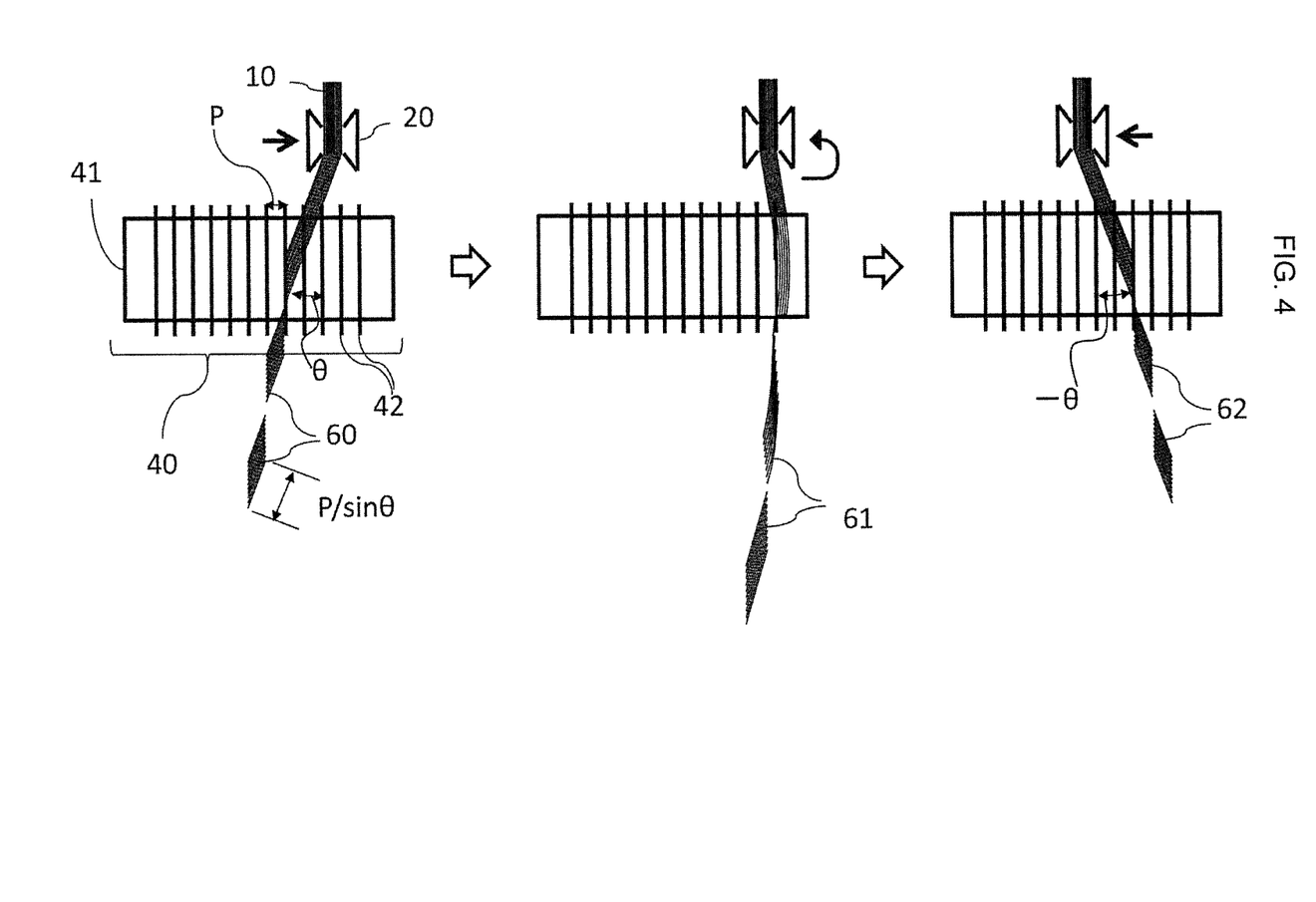
FIG. 4 is a schematic view showing an example of movement of traverse guide.

As shown in FIG. 4, reinforcing fiber yarn 10 can be continuously cut by altering the traverse direction when reinforcing fiber yarn 10 reaches the end of cutter roll 40 through traverse guide 20. Traverse guide 20 turns at the end and then traverses to the opposite direction so that the cutting angle changes from θ [°] to −θ [°]. "−θ [°]" means a reversed direction of left and right with respect to disk blade 42. When relative velocity V [m/min] is constant around the turn-round, chopped fiber bundles 60 and 62 having substantively the same cutting length and cutting angle are provided to have shapes line-symmetric to each other. This process can be performed continuously and efficiently by repeating to alter the traverse direction when reinforcing fiber yarn 10 reaches the roll end.

At the time of turning of traverse guide 20, angle θ [°] gets closer to 0° while the cutting angle changes from θ [°] to −θ [°], to provide chopped fiber bundle 61 having a cutting length longer than P/sin θ [mm]. The cutting length of too much longer than ordinary cutting length might cause adverse effects such as ununiform quality. To avoid such a length of chopped fiber bundle 61, it is preferable that a mechanism that arbitrarily adjusts the mobile velocity of traverse guide 20 described above is provided to stop traverse guide 20 immediately at the turn-round of the end and that it is suddenly-accelerated in the turning direction so that the cutting angle changes from θ [°] to −θ [°] as soon as possible.

It is also preferable that the running velocity of traverse is increased only at the turn-round of the end to make θ greater, because the cutting length can be changed by changing angle θ as described above. Because the greater θ shortens the cutting length, the fiber length of chopped fiber bundle 61 can also be shortened relatively.

Figure 5:
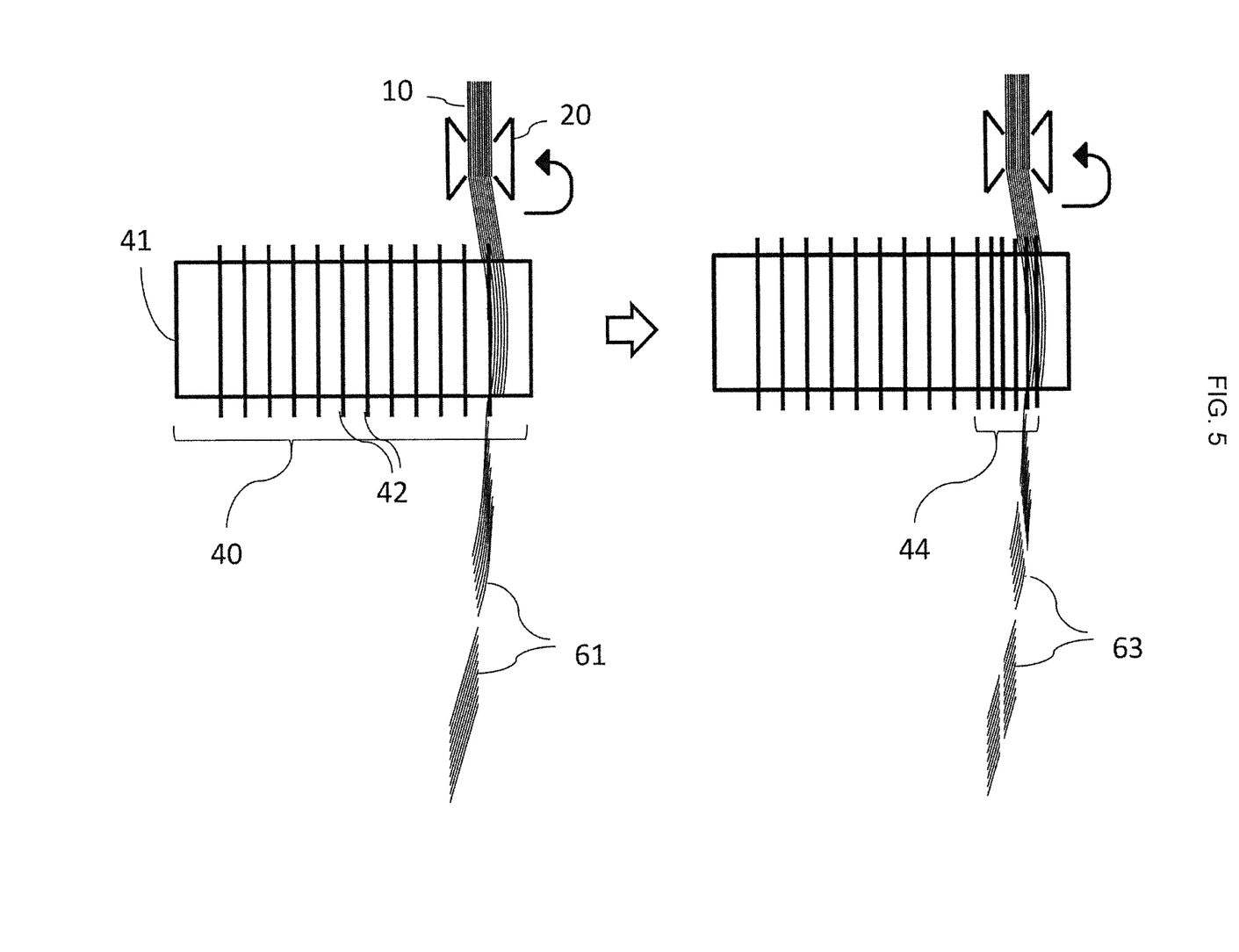
FIG. 5 is a schematic view showing an example of disk blade provided on cutter roll.

When traverse guide 20 cannot be controlled easily, it is preferable that blade crowded part 44 where disk blades 42 are arranged at interval of narrowed pitch P [mm] is provided at the end of cutter roll 40 for turning traverse guide 20 as shown in FIG. 5. Blade crowded part 44 can provide chopped fiber bundle 63 refined more than chopped fiber bundle 61.

Figure 6:
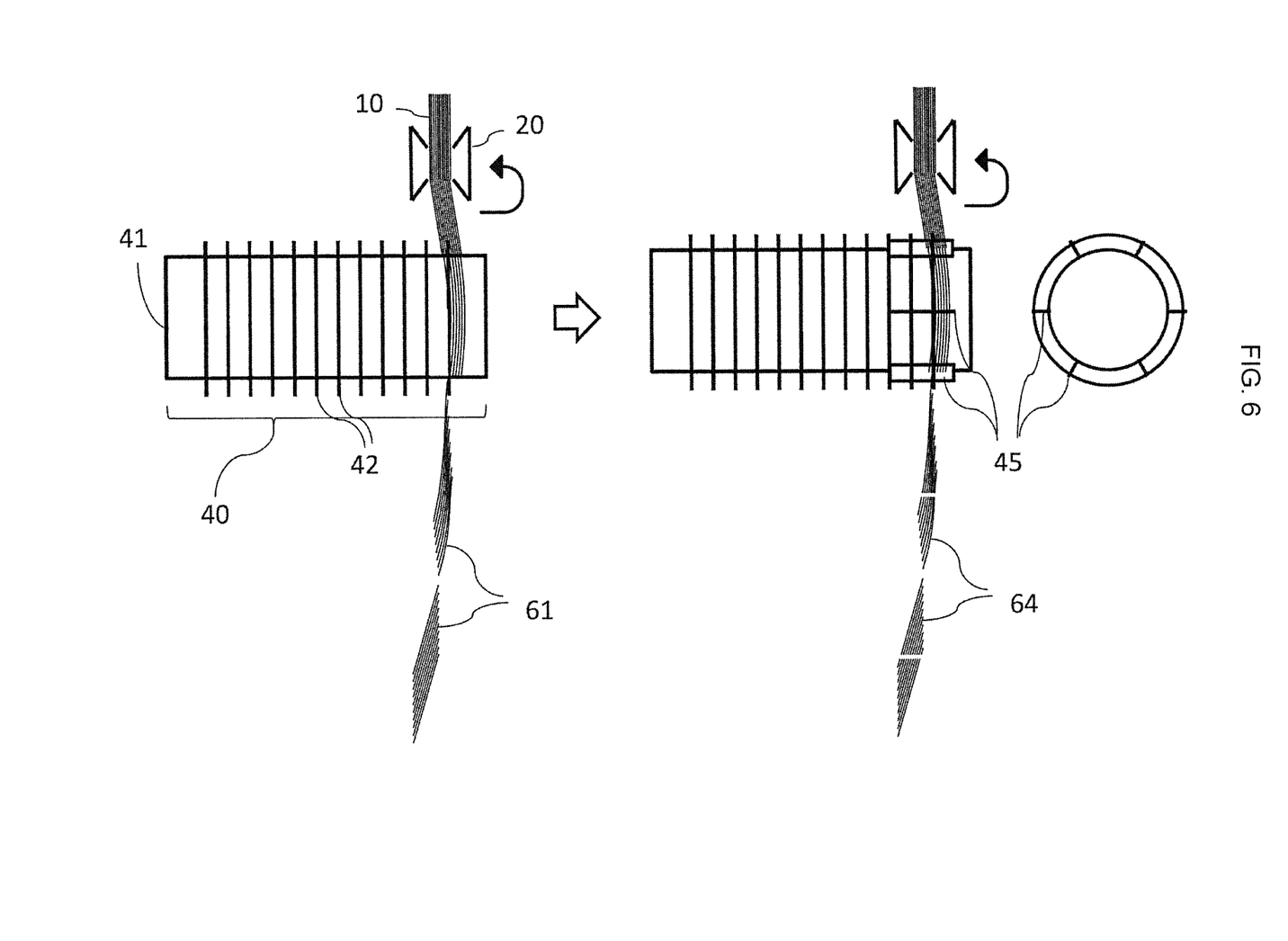
FIG. 6 is a schematic view showing disk blade and additional blade provided on cutter roll.

It is also preferable that additional blade 45 bridging adjacent disk blades 42 is provided at the end of cutter roll 40 to turn traverse guide 20 as shown in FIG. 6. With such a configuration, chopped fiber bundle 64 made by forcibly segmentalizing chopped fiber bundle 61 can be provided at the turn-round of end of cutter roll 40 where fiber length tends to be long. Additional blade 45 can be shaped and arranged in any manner such that the additional blade is provided obliquely to adjacent disk blades 42 to forcibly segmentalize the fiber obliquely, although FIG. 6 shows radial arrangement and approximately-orthogonal arrangement with respect to adjacent disk blades 42.

It is possible that when reinforcing fiber yarn 10 reaches the end of cutter roll 40 through traverse guide 20, the traverse is continued until it falls off the end of cutter roll 40 and then reinforcing fiber yarn 10 is introduced again from the end of any cutter roll 40. It is also possible that a plurality of cutter rolls 40 revolve and traverse reinforcing fiber yarn 10 so that reinforcing fiber yarn 10 is transferred from one cutter roll 40 to its adjacent cutter roll 40. These options can avoid a problem accompanying the turn-round at the end of cutter roll 40.

Although some examples with turn-round of traverse guide 20 have been explained so far, the same configurations as described above can be applied when cutter roll 40 and nip roll 30 are driven left and right in approximately-parallel along the rotation axis of traverse guide 20 by a reciprocating drive mechanism.

Figure 7:
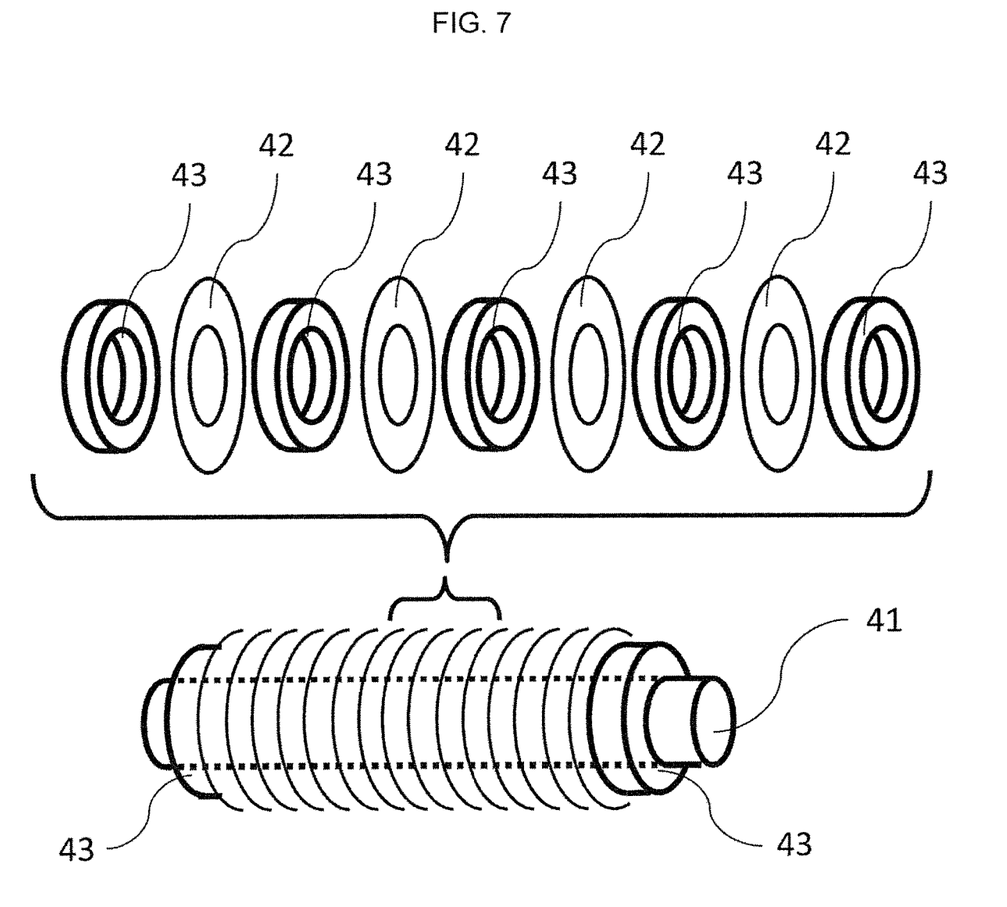
FIG. 7 is a schematic view showing an example of cutter roll configuration.

FIG. 7 shows an example of cutter roll 40. Cutter roll 40 comprises disk blades 42 of which outer edge attaches blades and of which center has a fixing opening and disk-shaped spacers of which center has a fixing opening, wherein roll core 41 is inserted into the openings of alternating disk blades 42 and spacers 43. With such a configuration, worn disk blade 42 can be replaced individually so that time and cost required for replacing disk blade 42 can be reduced. Such an advantage is effective in cutting reinforcing fibers having a high strength such as hard carbon fiber since this type of fibers wear disk blades 42 out to be often replaced. Also, such a configuration is advantageous because the interval between disk blades 42 can easily and accurately be changed by replacing or reordering spacers 43. Further, a plurality of cutter rolls 40 are not necessary because various angles θ [°] and various fiber length P/sin θ [mm] are available with a single kind of cutter roll 40. Furthermore, the protrusion amount of blade from the surface of cutter roll 40 can be controlled by adjusting the diameter of disk blade 42 or spacer 43. Thus, various thickness of reinforcing fiber yarn 10 can be accepted.

With such a configuration, the shape of disk blade 42 may be very simple and therefore disk blade 42 can be made of a hard material such as high-speed steel which is not easily processed. Spacer 43 can be made of various materials for the same reason.

Figure 8:
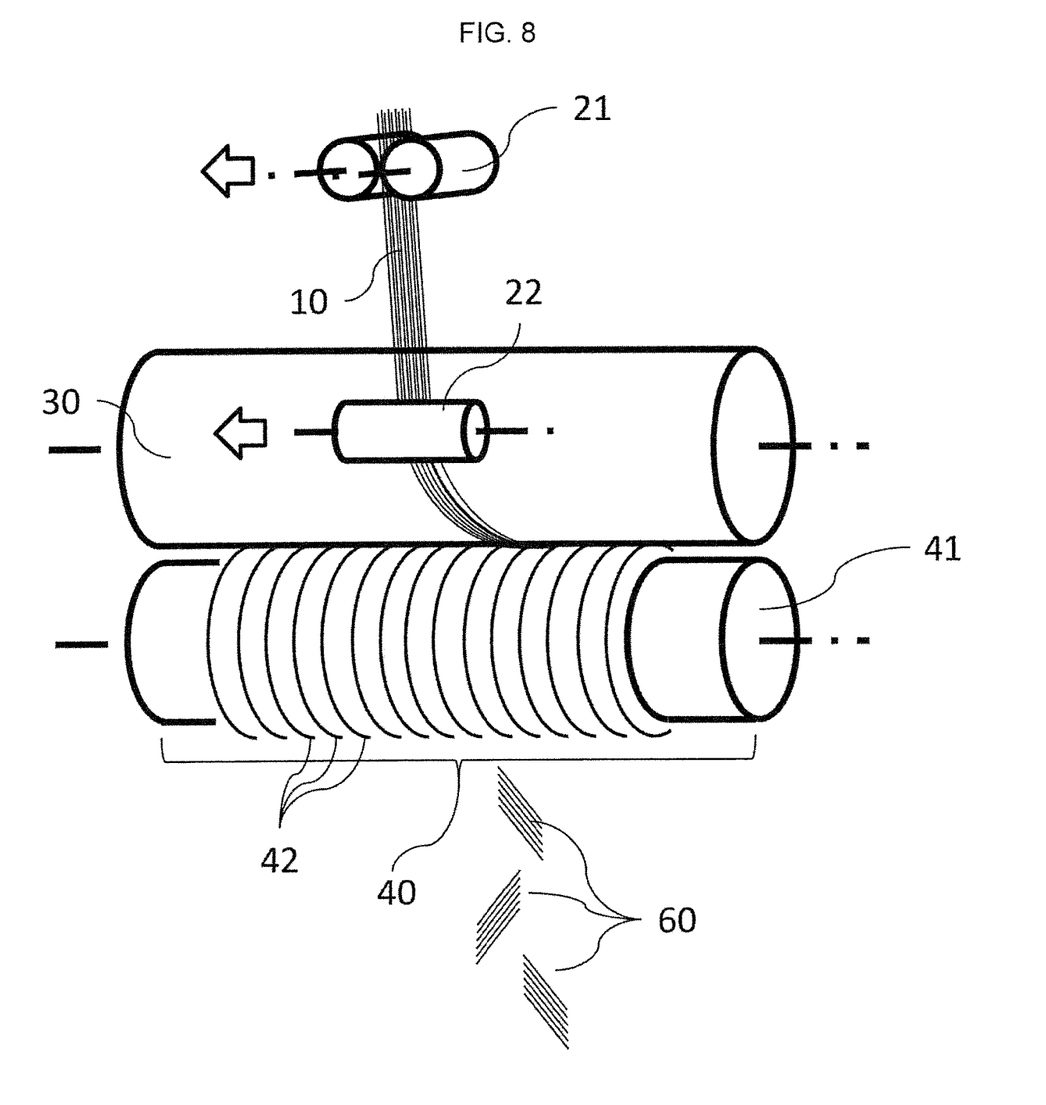
FIG. 8 is a perspective view showing another example of our manufacturing method of chopped fiber bundle.

FIG. 8 shows another example of our device for manufacturing a chopped fiber bundle. This configuration comprises first traverse rolls 21 and second traverse roll 22, wherein first traverse rolls 21 tuck reinforcing fiber yarn 10 and regulate the position in the left and right direction while second traverse roll 22 leads reinforcing fiber yarn 10 onto the surface of nip roll 30. The first traverse roll and the second traverse roll may be coupled or synchronize. Alternatively, both of them may be fixed or at least one may move independently when nip roll 30 or cutter roll 40 reciprocates. In the configuration shown in FIG. 8, reinforcing fiber yarn 10 is led onto the surface of second traverse roll 22 while being twisted between first traverse roll 21 and second traverse roll 22. Reinforcing fiber yarn 10 always receives a force to approach orthogonally to the rotation axis of downstream traverse roll 22 by rotation of second traverse roll 22 so that reinforcing fiber yarn 10 is always led to run at a predetermined position on second traverse roll 22. And then, reinforcing fiber yarn 10 on second traverse roll 22 is led as being transferred onto the surface of nip roll 30.

Different from traverse guide 20 shown in FIG. 1, this configuration doesn't require roll or bar having a brim and therefore yarn width of reinforced fiber yarn 10 doesn't become thinner by contacting the brim. When second traverse roll 22 is provided as close as possible to nip roll 30 without contact, the width can be kept wider. The distance between first traverse roll 21 and second traverse roll 22 should be as wide as possible to avoid yarn width narrowing derived from twisting yarn. To avoid the above-described yarn width narrowing, it is preferable that the yarn is twisted stepwise with a roll or guide further provided between first traverse roll 21 and second traverse roll 22. The roll other than second traverse roll may be replaced by a fixed guide or the like.

Figure 9:
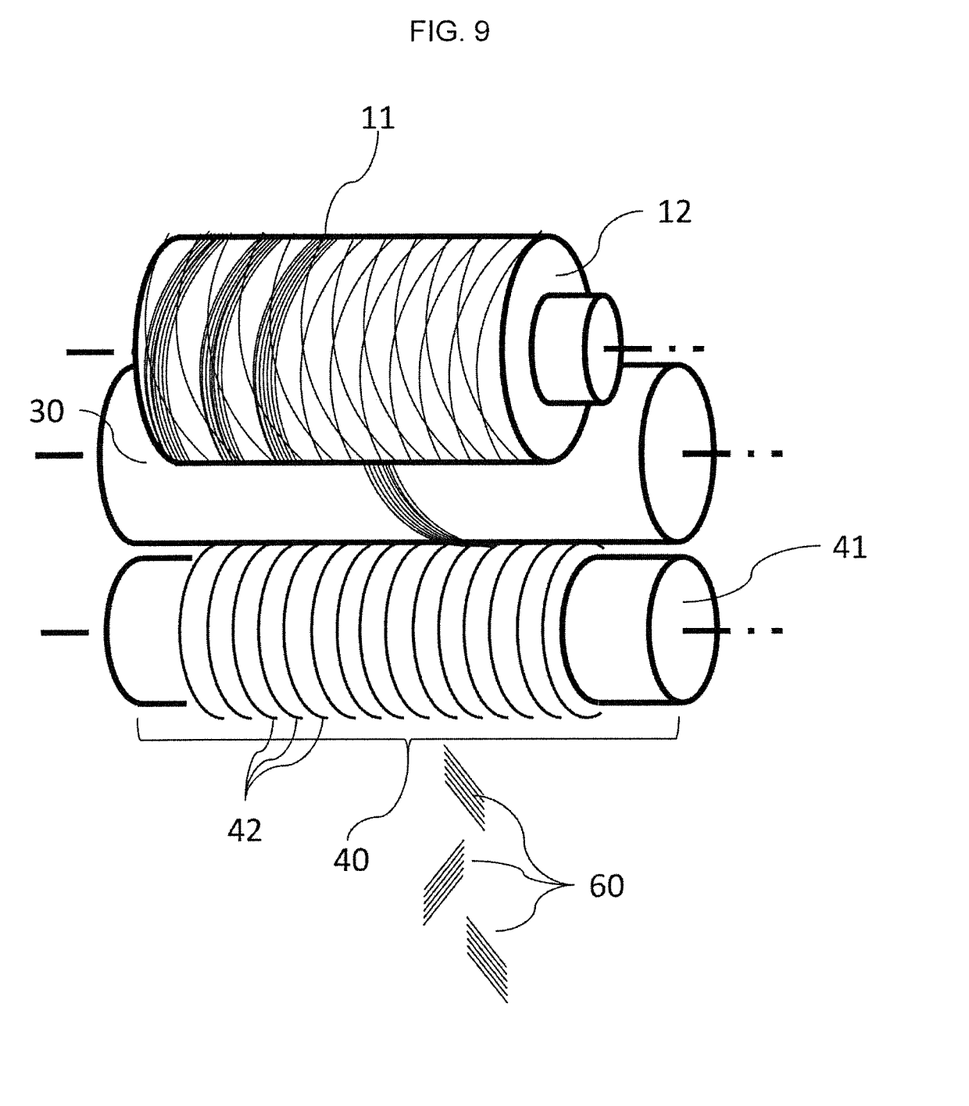
FIG. 9 is a perspective view showing yet another example of our manufacturing method of chopped fiber bundle.

FIG. 9 shows yet another example of our device for manufacturing a chopped fiber bundle. Bobbin 12 is provided close to nip roll 30, and reinforcing fiber yarn 11 pulled out from bobbin 12 onto the outermost bobbin surface is introduced to a cutter in a manner of transferring to nip roll 30. Because reinforcing fiber yarn 11 on the outermost bobbin surface is generally wound obliquely to the center axis of bobbin, the position at which yarn is pulled out moves as traversing along the bobbin axis as pulling yarn out. This movement of the traverse can be used to introduce yarn obliquely to the cutter roll.

Figure 10:
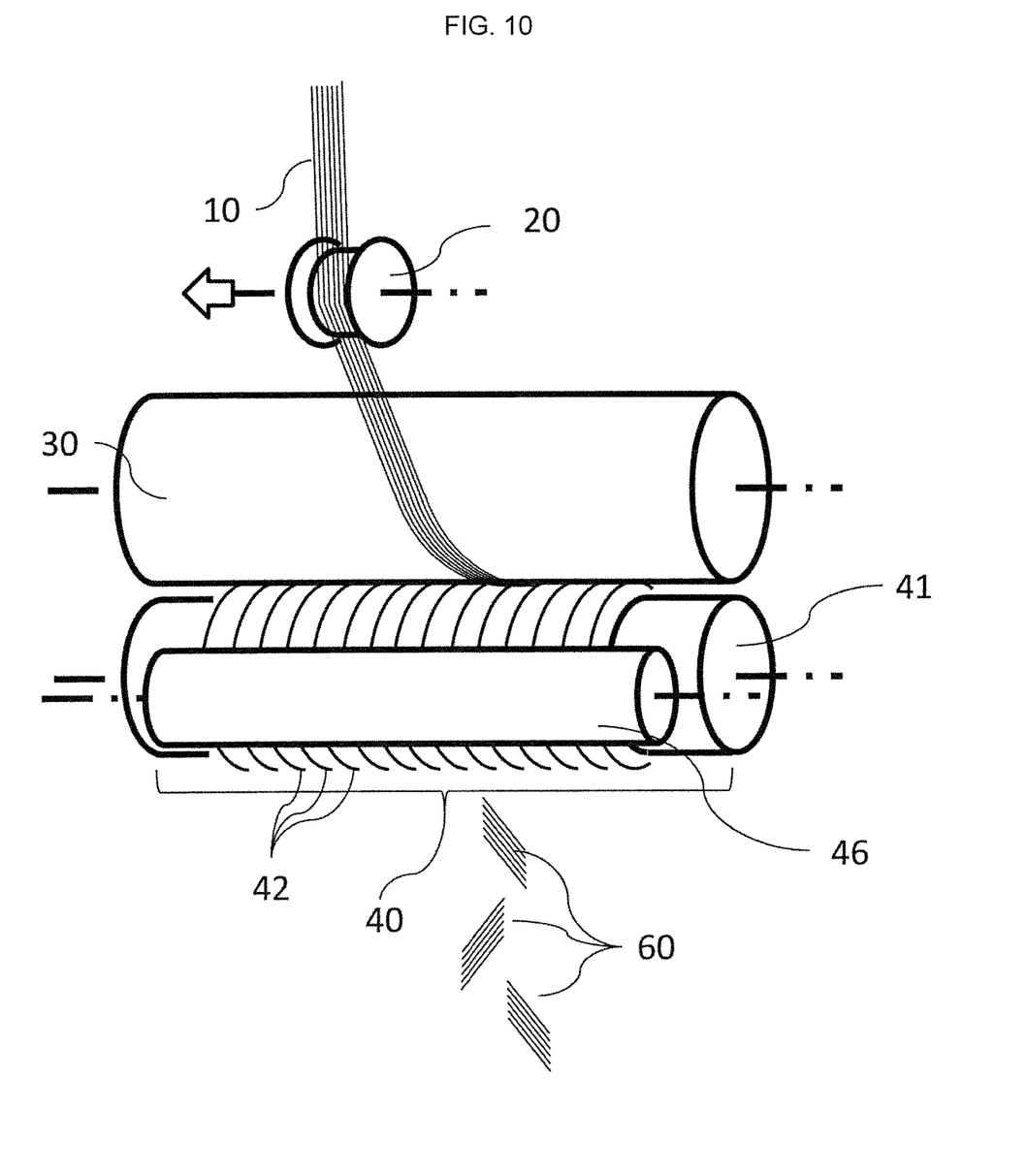
FIG. 10 is a perspective view showing an example of cleaning method of our manufacturing device of chopped fiber bundle.

FIG. 10 shows an example of cleaning mechanism of our device for manufacturing a chopped fiber bundle. Extraneous substance adhering to the surface of cutter roll 40 can be removed easily by rotating cleaning roll 46 contacted with cutter roll 40 as an object to be cleaned. Although the rotation direction is not limited in particular, difference between circumferential speeds between cutter roll 40 and cleaning roll 46 can work on wiping and cleaning the surface of cutter roll 40. The wiping can be performed smoothly without being caught on the blade because the blade direction corresponds to the wiping direction. It is difficult for the above-described conventional cutter roll, which has linear blades in a circumferential direction of roll or has obliquely arranged blades, to be wiped effectively because the blade might be caught or bitten by cleaning roll 46. Cleaning roll 46 made of a soft material such as rubber can perform cleaning without damaging cutter blades so that cleaning roll 46 bitten into blades effectively wipes extraneous substance adhering inside blades, although the material is not limited in particular. Alternatively, the same effect can be achieved by a configuration such that grooves are provided on cleaning roll 46 made of no soft material like rubber in the circumferential direction so that contact with blades is avoided. On the other hand, the cleaning roll doesn't need to contact cutter blades. Even when there is a gap between them, extraneous substance adhering to the surface can be fallen off by the cleaning roll contacting the extraneous substance to achieve the cleaning effect. Further, the same good cleaning effect can be achieved when cleaning roll 46 is applied to nip roll 30.

The invention claimed is:

1. A device for manufacturing a chopped fiber bundle comprising a cutter roll provided with one or more disk blades on a circumference of a roll core, the roll core having a center axis, the center axis coinciding with a rotation axis of the roll core and the device also comprising a nip roll provided in parallel with the rotation axis of the roll core, the nip roll to feed a reinforcing fiber yarn to be continuously cut between the nip roll and the cutter roll, the device further comprising:

a traverse guide running approximately parallel to the rotation axis of the roll core and traversing the reinforcing fiber yarn along the rotation axis of the roll core so that the reinforcing fiber yarn is led between the cutter roll and the nip roll, wherein the traverse guide comprises a pair of first traverse rolls and a second traverse roll, the first traverse rolls tuck the reinforcing fiber yarn while moving in a left and right direction along the rotation axis of the roll core to regulate the positioning of the reinforcing fiber yarn in a left and right direction, and the second traverse roll leads the reinforcing fiber yarn on the second traverse roll onto a surface of the nip roll.

2. The device according to claim 1, wherein the second traverse roll of the traverse guide is provided close to and in parallel with the nip roll.

3. The device according to claim 1, wherein a cleaning roll is provided close to and in parallel with an axial direction of at least one of the cutter roll and the nip roll.

4. The device according to claim 1, wherein the one or more disk blades is a plurality of disk blades and a plurality of spacers alternating on the circumference of the roll core.

5. A method of manufacturing a chopped fiber bundle using the device according to claim 1, comprising steps of:
feeding the reinforcing fiber yarn to be continuously cut between the nip roll and the cutter roll while rotating the cutter roll; and
traversing the reinforcing fiber yarn along the rotation axis of the roll core with the traverse guide to continuously cut the reinforcing fiber yarn.

6. The device according to claim 1, wherein the traverse guide runs to the left and right directions approximately parallel to the rotation axis of the roll core.

7. The device according to claim 1, wherein the reinforcing fiber yarn led by the traverse guide is fixed by tension to keep a predetermined angle between the traverse guide and the nip roll.

* * * * *